Dec. 31, 1929.   K. E. LYMAN   1,741,865
AUTOMATIC TRANSMISSION
Original Filed Sept. 12, 1928   3 Sheets-Sheet 1

INVENTOR.
Kenneth E. Lyman
BY
William H. Knight
ATTORNEY

Dec. 31, 1929.　　　　　K. E. LYMAN　　　　　1,741,865
AUTOMATIC TRANSMISSION
Original Filed Sept. 12, 1928　　3 Sheets-Sheet 2
Fig. 2
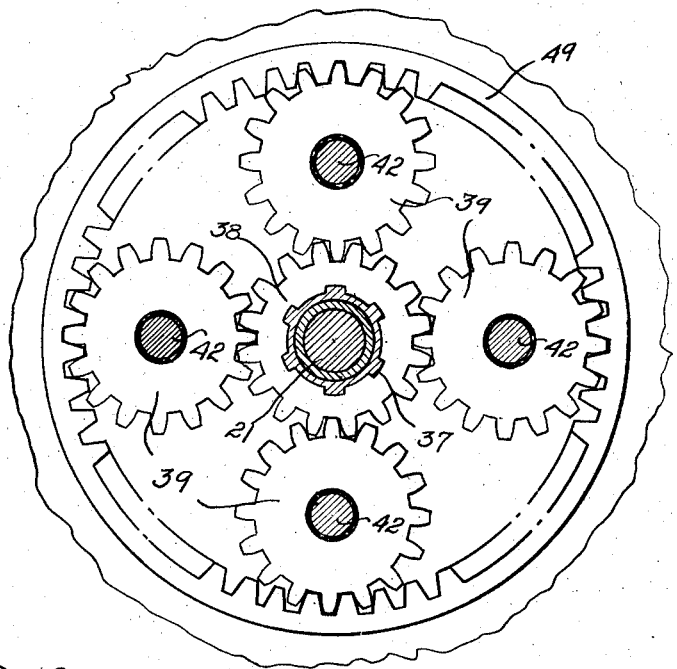
Fig. 7
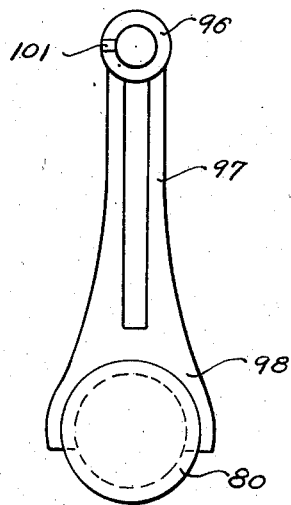
Fig. 6
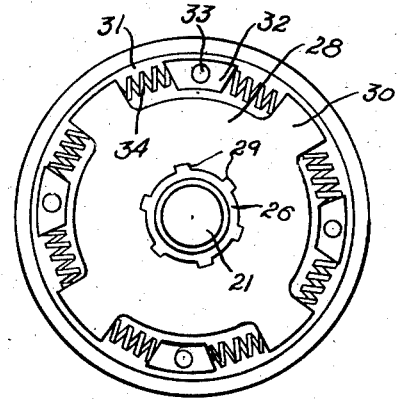
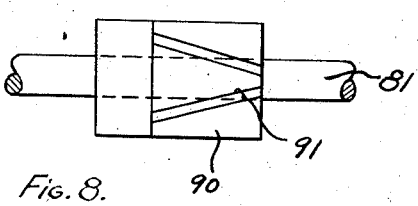
Fig. 8.
INVENTOR.
Kenneth E. Lyman
BY
William H. Knight
ATTORNEY Dec. 31, 1929.                  K. E. LYMAN                    1,741,865
                            AUTOMATIC TRANSMISSION
                    Original Filed Sept. 12, 1928    3 Sheets-Sheet 3
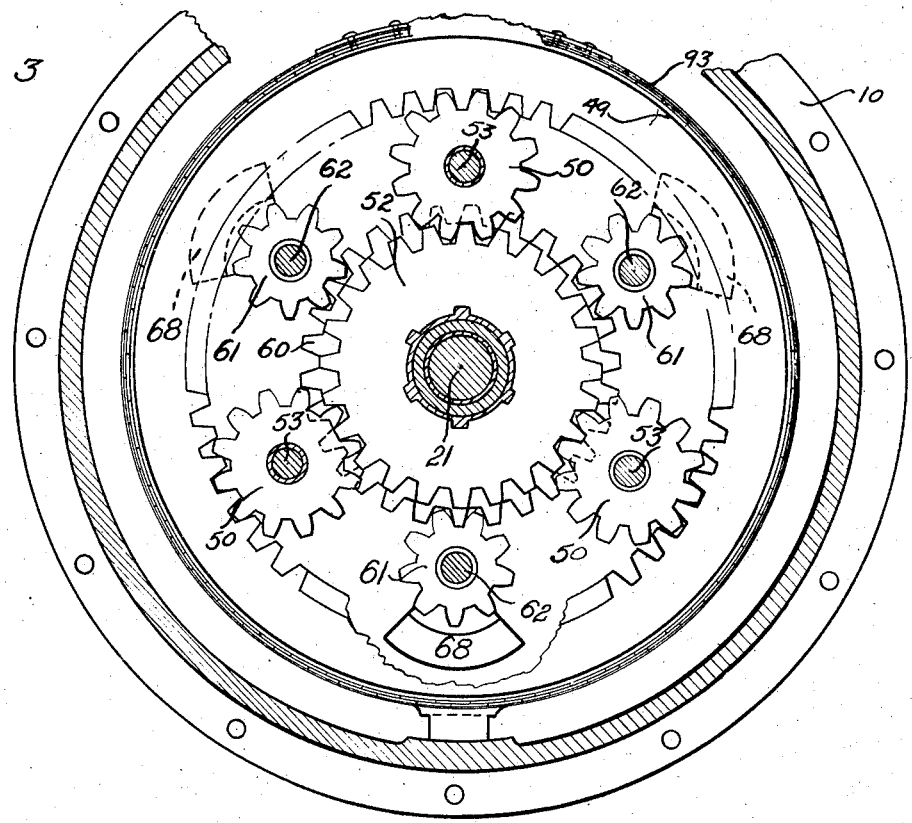
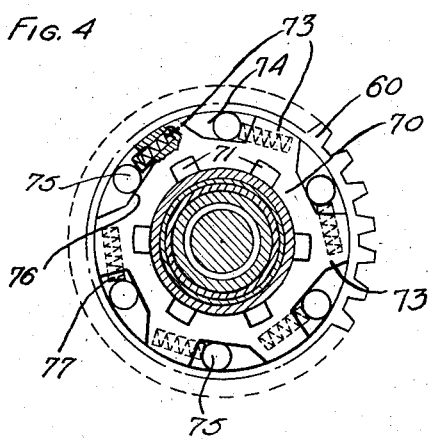
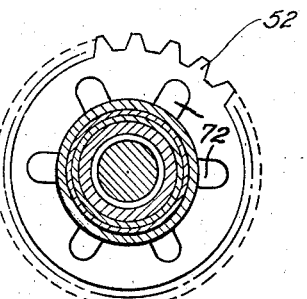
INVENTOR.
Kenneth E. Lyman
BY
ATTORNEY Patented Dec. 31, 1929

1,741,865

UNITED STATES PATENT OFFICE

KENNETH E. LYMAN, OF ROCKFORD, ILLINOIS, ASSIGNOR TO AUTOMATIC TRANS-MISSION COMPANY, OF ROCKFORD, ILLINOIS, A CORPORATION OF ILLINOIS

AUTOMATIC TRANSMISSION

Application filed September 12, 1928, Serial No. 305,364. Renewed November 18, 1929.

The present invention relates in general to power transmitting mechanisms and has particular reference to an improved automatic transmission which is especially adaptable for use in connection with motor driven vehicles.

In my co-pending application, filed August 9, 1928, Serial No. 298,453, I have disclosed an automatic transmission which has for its primary object the provision of an automatic control, of the centrifugal responsive type, for planetary change speed mechanisms and with such a type of control provided in a co-operative relationship of parts whereby the effective inherent inertia forces resulting from the operation of such type of control are eliminated, for all practical purposes, without sacrificing the effectiveness of the inherent centrifugal forces.

The present invention has for one of its objects the provision of the same type of control with the added feature of an important change in the means for reversing the mechanism.

While the foregoing briefly explains the nature of the present improvements other objects and advantages not herein specifically referred to will be readily appreciated upon a full comprehension of the novel features presented in the construction, arrangement and manner of operation of the transmission.

In order that the invention may be readily understood, an embodiment of the same is set forth in the accompanying drawings, and in the following detailed description.

It is understood that those skilled in the art may make various changes in the construction and arrangement of the parts without departing from the spirit and scope of the invention as defined in the subjoined claims, and I therefore do not wish to be restricted to the precise construction contained herein.

In the drawings:

Fig. 2 is a view in section taken on the line 2—2, Fig. 1.

Fig. 3 is the view in section taken on the line 3—3, Fig. 1.

Fig. 4 is a detailed view in front elevation of one part of the over-running clutch.

Fig. 5 is a similar view of the companion part of the over-running clutch.

Fig. 6 is a view in front elevation of the flexible connection between the driving shaft and the change speed mechanism of the transmission.

Fig. 7 is a detailed view front elevation of the dog clutch actuating lever, and Fig. 8 is a detailed bottom plan view of a part of the braking mechanism.

Figure 1:
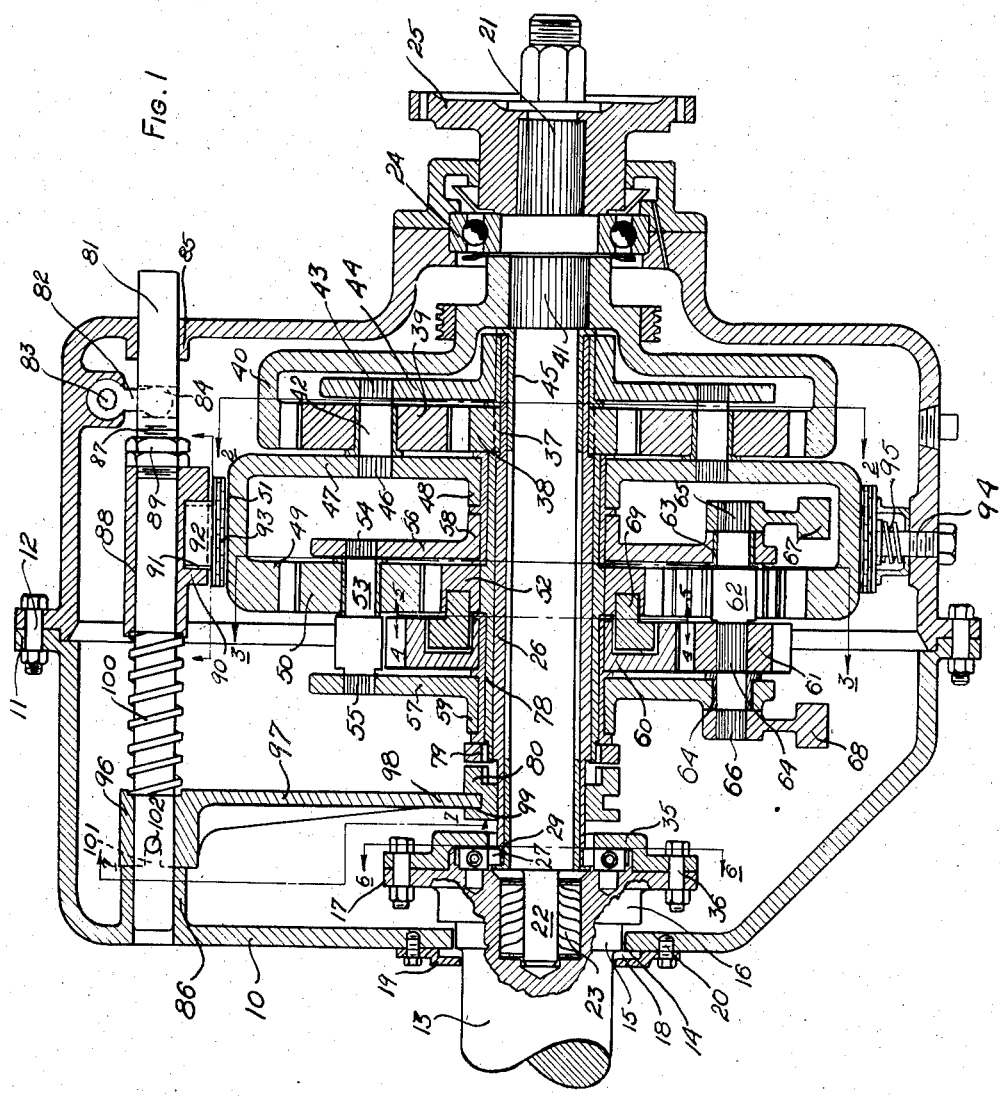
Fig. 1 is a longitudinal section of mechanism constructed in accordance with the preferred embodiment of my invention.

Referring now to the drawings in detail, 10 represents the housing which is preferably made in two parts joined as at 11 by means of bolts or the like 12 of which pass through the confronting companion flanges on each of the two parts of the housing. The drive shaft 13 enters the housing 10 through an opening 14 in one side thereof and is provided with step diameters 15 and 16, the smaller one of which providing a bearing surface in the opening 14 and larger one of which having a radial flange 17. The opening 14 may be closed by a packing 18 which is held in place by a packing ring 19, bolted or otherwise secured as at 20 to the outside of the housing.

The driven shaft 21 enters the housing 10 through an opening in the opposite side, and extends through the housing with a reduced diameter 22 on the end thereof received within an axial bore in the end of the driving shaft 13. A suitable roller bearing 23 is provided within this axial bore for supporting the reduced diameter 22 of the driven shaft. The opposite end of the driven shaft is supported in the opening of the housing by a ball bearing 24 and a connecting plate 25 is splined on the shaft for connecting customary universal joint (not shown).

Journaled on the driven shaft 21 is a relatively long sleeve 26, the forward end of which is fixedly connected to the driving shaft 13 through means of a flexible connection 27. This flexible connection is employed for eliminating driving impulses between the driving shaft and the speed changing mechanism. It preferably comprises a ring member 28 which is splined as at 29 on the sleeve 26. The ring member is constructed with radial projections 30 which are arranged in annular spaced relation to provide a series of spaces 31. Arranged in these spaces 31 intermediate to the projections 30 are blocks 32 which are fixed to the driving shaft 13 by means of rivets, pins or the like 33. The blocks 32 are spaced from the projections 30 by coil springs 34. Two coil springs are provided for each space 31 and the springs are arranged on opposite sides of the blocks 32 so that they bear against the projections 30. The mechanism of this flexible connection is suitably confined behind a ring plate, 35 which is bolted or otherwise secured as at 36 to the radial flange 17 on the largest diameter 16 of the driving shaft.

Splined as at 37 on the opposite end of the sleeve 26 is a sun gear 38 of the primary planetary system. This sun gear 38 is in constant driving relation at all times with the driving shaft 13 through means of its splined connection with the sleeve 26 and the splined connection as at 29 between the sleeve 26 and the flexible connection 27 of the driving shaft 13.

The sun gear forms a part of a planetary gear train of which the planet gears 39 form another part. These planet gears 39 are in constant mesh with the sun gear 38 and also in constant mesh with the ring gear 40 which is splined as at 41 on the driven shaft 21. Planet shafts 42 are provided for the planet gears 39 and on which the gears are journaled. One end of these planet shafts 42 are splined as at 43 in the rear part 44 of a two part planet carrier the same having a sleeve 45 which is journaled on the driven shaft. The opposite end of the shafts are splined as at 46 in the part 47 of the carrier which is also provided with a sleeve 48 journaled on the driven shaft. The part 47 of the carrier is made with a ring gear 49 which is in constant mesh with the planet gears 50 in the second planetary gear train or system. The part 47 of the carrier thus becomes a combined planet carrier and ring gear connecting the two planetary gear trains or systems. It is also constructed with a brake surface 51 on its outer circumference so that its rotation may be arrested, as will be hereinafter more specifically shown.

The secondary planet gears 50 are in constant mesh with the secondary sun gear 52 and the planet shafts 53 for the gears 50 and on which the gears are journaled are splined as at 54 and 55 in the two parts 56 and 57 of a secondary planet carrier. These parts 56 and 57 of the secondary planet carrier are each provided with sleeves 58 and 59 respectively which are journaled relatively to the driven shaft 21.

The primary and secondary sun gears 38 and 52 respectively are of different diameter and the planet gears 39 and 50 in the two systems are like-wise of different diameters. This also is like-wise true of the two ring gears 40 and 49.

Associated with the secondary gear train is a supplemental system which comprises a supplemental sun gear 60, supplemental planet gears 61 in constant mesh with the sun gear 60. The supplemental planet shafts 62 for the gears 61 unlike the planet shafts 53 are journaled as at 63 and 64 in the two parts 56 and 57 of the secondary planet carrier.

The planet gears 61 instead of being journaled on the shaft 62 as are the gears 50 with respect to the shafts 53, are splined as at 64. In other words, while the shafts 53 are splined to the carrier, the shafts 62 are journaled in the carrier and where the gears 50 are journaled on the shaft 53 the gears 61 are splined on the shaft 62.

Splined as at 65 and 66 on the ends of the shafts 62 are centrifugal weights 67 and 68. The weights are thus fixed to planetate with the shafts 62. The sun gears 52 and 61 are connected through the medium of a one way clutch 69 so that the sun gear 60 can run ahead of the sun gear 52. This one way clutch is best illustrated in Figs. 4 and 5 and it might be mentioned here in this respect, that the supplemental sun gear 60 is of larger diameter than the secondary sun gear 52. The supplemental planet gear 61 which meshes only with the supplemental sun gear 60 are of smaller diameter than the secondary sun gears 50. Referring again to the details of the one way clutch mechanism and particularly to Figs. 4 and 5 the supplemental sun gear 60 is made with a hollow internal area for accommodating a ring-like spider 70. This ring-like spider is made with a series of annular spaced lugs 71 which project from the side of the same and are accommodated in slots or recesses 72 provided in the side of the secondary ring gear 52. Formed as an integral part of the spider-like ring 70 are a series of annular spaced projections 73 providing spaces 74 in which are mounted wedging rollers 75. The tangential surfaces 76 at the bottom of the recess or spaces 74 and the curvature provided by the inner circumference of the gear produce wedging spaces whereby the rollers 75 when urged forwardly by spring pressed plungers 77 will lock the spider-like ring 70 to the gear. Rotation of the gear or spider-like ring in the opposite direction will release the rollers permitting relative rotation between these parts. Since the secondary sun gear 52 is fixed against rotation relative the ring-like spider 70 by means of the lugs 71 in the recess 72 the two sun gears are thus connected with freedom of relative rotation in one direction but are locked against relative rotation in opposite direction.

The centrifugal responsive devices such as the weights 67 and 68 are directly associated with the supplemental system and the one way clutch mechanism is intended to cooperate with the assembly in such a manner as to eliminate for all practical purposes the effectiveness of the inherent inertia forces of the centrifugal devices so that only the centrifugal or retarding forces developed as a result of the operation of the centrifugal devices will be effectively established in the mechanism.

By the variations in the gear ratios, various rates of rotation of the centrifugal device may be realized. If the ratios of the primary and secondary system were equalized, no rotation of the centrifugal device would result, therefore, the centrifugal forces developed would not be effective. With the arrangement shown, however, the rotation of the weights are reduced to a minimum without sacrificing their effectiveness. The relatively slow rotation of the weights gives the over-running clutch plenty of time to function which, of course, increases the efficiency of the automatic control.

The above described construction and the advantages attributed to the same are all fully disclosed in my co-pending application, Serial No. 298,453, filed August 9, 1928, and hereinbefore mentioned. The improvements in the present construction have to do primarily with a reversed drive. In my co-pending application above identified, both the primary and secondary sun gears are permanently fixed relatively to the driving shaft. In this case, however, while both the primary and secondary sun gears are connected in driving relation with the driving shaft for forward speeds, I have provided means whereby the secondary sun gear may be released from driving relation with the driving shaft when the drive is reversed. I preferably accomplished this purpose by using two sleeves instead of one as in my co-pending case above identified, and in the present case the primary sun gear is splined on the sleeve 26 and the secondary sun gear is splined to the other sleeve. The sleeve 78 is therefore provided for the secondary sun gear 52 and the sun gear is splined thereto. This sleeve is shorter than the sleeve 26 for the primary sun gear and terminates forwardly just in advance of the sleeve 59 on the part 57 of the secondary planet carrier. The sleeve 78 in this respect is journaled with freedom of rotation upon the sleeve 26 and on its forward end is a clutching ring 79 which is adapted to be engaged by an axially slidable clutching dog 80 which is mounted free to slide on the splined area of the sleeve 26, but restrained from rotating independently thereof.

The mechanism illustrated in Fig. 1 is shown in neutral. If it were desirable to go into a forward drive the clutching dog 80 would be manually moved to engage the clutch ring 79 which would connect the secondary sun gear 52 with the driving shaft 13, therefore at all forward speeds, a double sun gear drive is effected. To go into reverse, I have provided a manually operable means whereby the supplemental sun gear 52 will first be disconnected then the rotation of the combined ring gear and planet carrier 47 will be arrested. It is important that the mechanism operate in this sequence. This manually operable reversing mechanism preferably comprises a shifting shaft 81 which is controlled by means of an arm 82 fixed at one end on a rotatable shaft 83 with its opposite end confined within a slot or like 84 in the shaft 81. The shaft 83 may be rotated by a suitable lever arrangement conveniently accessible to the driver of the vehicle. Shaft 81 is slidably mounted in the housing 10 by means of a boss 85 on one side of the housing and a longer boss 86 on the opposite side. For a short portion of its length the shaft 81 is threaded as at 87 and extends through a sleeve 88, lock nuts 89 being employed for holding the sleeve 88 in a longitudinally adjusted position on the shaft. Depending from the sleeve 88 is a block-like integral part 90 having a wedge shaped camming slot 91 in which the attaching ears 92 on the brake band 93 are seated. Brake band 93 encircles the braking surface on the outer circumference of the combined ring gear and planet carrier 49. The brake band is anchored on the diametrically opposite side of the braking surface by means of an adjusting bolt 94 which is backed up by a compression spring 95 which nominally acts to hold the brake band away from the friction surface with a clearance sufficient to prevent undue wear.

Slidably mounted on the shaft 81 is a sleeve 96 which has a depending lever arm 97, the end of which terminates in a fork 98 which is seated in a circumferential groove 99 in the dogging clutch 80. Coiled around the shaft 81 between the two sleeves 88 and 96 is a compression spring 100. The sleeve 96 is provided with a slot 101 and a pin 102 on the shaft is seated in this slot. When the shaft 81 is shifted to the right as viewed from Fig. 1, the pin 102 will bodily move the depending lever arm 97 causing the clutching dog 80 to engage the clutch ring 79, thus connecting the sun gear 52 in driving relation with the driving shaft. Further movement of the shaft in the same direction will cause the camming slot 91 to release the brake band. The mechanism is then in a forward drive. When it is desirable to go into reverse, the shaft 81 is moved to the left as viewed from Fig. 1, whereupon the clutch will first be disengaged and further movement of the shaft in the same direction will cause the camming slot 91 to tighten the brake band, thus arresting rotation of the combined ring gear and planet carrier. When the mechanism has been shifted into reverse, there will be no motion imparted to the secondary system or the supplemental system, as the sun gear 52 is disengaged and the combined ring gear and planet carrier 49 is stationary.

Having thus described and shown an embodiment of my invention, what I claim and desire to secure by Letters Patent of the United States is:

1. In an automatic transmission, driving and driven shafts, planetary change speed mechanism for connecting said shafts in different speed ratios, comprising primary and secondary gear systems each having a sun gear, means for connecting said sun gears with the driving shaft, means for reversing the drive in said mechanism, means for disconnecting one of said sun gears from the driving shaft when the drive in the mechanism is reversed, and means for automatically changing the driving ratio in said transmission.

2. In an automatic transmission, driving and driven shafts, planetary change speed mechanism for connecting said shafts in different speed ratios, comprising primary and secondary gear systems each having a sun gear, a fixed connection between the sun gear in the primary system and the driving shaft, a releasable clutching connection between the sun gear in the secondary system and the driving shaft, and means for automatically changing the driving ratio in said transmission.

3. In a transmission, driving and driven shafts, planetary change speed mechanism for connecting said shafts in different speed ratios, comprising primary and secondary gear systems each having a sun gear, means for automatically changing the speed ratio in said mechanism, means for connecting both of said sun gears with the driving shaft, means for reversing the drive in said mechanism, a releasable clutch for disconnecting the sun gear in the secondary system from the driving shaft when the drive in said mechanism is reversed.

4. In a transmission, driving and driven shafts, planetary speed changing mechanism for connecting said shafts in different speed ratios, comprising primary and secondary gear systems, each having a sun gear, a combined ring gear and planet carrier connecting said systems, means for connecting both of said sun gears with the driving shaft, means for automatically changing the ratio in said mechanism and means for reversing the drive in said mechanism, comprising a clutch for disconnecting the sun gear in the secondary system from driving relation with the driving shaft and means for holding the combined ring gear and planet carrier against rotation.

5. In a transmission, driving and driven shafts, planetary speed changing mechanism for connecting said shafts in different speed ratios, comprising primary and secondary gear systems, each having a sun gear, a combined ring gear and planet carrier connecting said systems, means for connecting both of said sun gears with the driving shaft, means for automatically changing the ratio in said mechanism and means for reversing the drive in said mechanism, comprising a clutch for disconnecting the sun gear in the secondary system from driving relation with the driving shaft and means for holding the combined ring gear and planet carrier against rotation, said sun gear disconnecting means and said holding means for the combined ring gear and planet carrier being manually operable as a unit.

6. In a transmission, driving and driven shafts, planetary speed changing mechanism for connecting said shafts in different speed ratios, comprising primary and secondary gear systems, each having a sun gear, a combined ring gear and planet carrier connecting said systems, means for connecting both of said sun gears with the driving shaft, means for changing the ratio in said mechanism and means for reversing the drive in said mechanism, comprising a clutch for disconnecting the sun gear in the secondary system from driving relation with the driving shaft and means for holding the combined ring gear and planet carrier against rotation.

7. In a transmission, driving and driven shafts, planetary speed changing mechanism for connecting said shafts in different speed ratios, comprising primary and secondary gear systems, each having a sun gear, a combined ring gear and planet carrier connecting said systems, means for connecting both of said sun gears with the driving shaft, speed responsive means for automatically changing the ratio in said mechanism and means for reversing the drive in said mechanism, comprising a clutch for disconnecting the sun gear in the secondary system from driving relation with the driving shaft and means for holding the combined ring gear and planet carrier against rotation, said sun gear disconnecting means and said holding means for the combined ring gear and planet carrier being manually operable as a unit.

8. In a transmission, driving and driven shafts, speed changing mechanism for connecting said shafts in different speed ratios, comprising primary and secondary planetary gear systems of variable gear ratios, a sun gear for each of said systems, means for automatically changing the speed ratio in said mechanism, means for connecting said sun gears with the driving shaft, means for reversing the drive in said mechanism, releasable clutching means for disconnecting the sun gear in the secondary system from the driving shaft when the mechanism is reversed.

9. A planetary speed changing mechanism comprising in combination, driving and driven shafts, inner and outer sleeves journaled with freedom of rotation relatively of the driven shaft, means for connecting one of said sleeves in fixed driving relation to the driving shaft, a manually operable clutch for connecting the other of said sleeves to the driving shaft, sun gears fixed to rotate with said sleeves, planet gears meshing with said sun gears, ring gears meshing with said planet gears, planet carriers for said planet gears, means connecting one of said ring gears with one of said planet carriers, and means for connecting the other of said ring gears with the driven shaft.

10. A planetary speed changing mechanims comprising in combination, driving and driven shafts, inner and outer sleeves journaled with freedom of rotation relatively of the driven shaft, means for connecting one of said sleeves in fixed driving relation to the driving shaft, a manually operable clutch for connecting the other of said sleeves to the driving shaft, sun gears fixed to rotate with said sleeves, planet gears meshing with said sun gears, ring gears meshing with said planet gears, planet carriers for said planet gears, means connecting one of said ring gears with one of said planet carriers, means for connecting the other of said ring gears with the driven shaft, and means for automatically changing the speed ratio in said mechanism.

11. A planetary speed changing mechanism comprising in combination, driving and driven shafts, inner and outer sleeves journaled with freedom of rotation relatively of the driven shaft, means for connecting one of said sleeves in fixed driving relation to the driving shaft, a manually operable clutch for connecting the other of said sleeves to the driving shaft, sun gears fixed to rotate with said sleeves, planet gears meshing with said sun gears, ring gears meshing with said planet gears, planet carriers for said planet gears, means connecting one of said ring gears with one of said planet carriers, means for connecting the other of said ring gears with the driven shaft, and means for automatically changing the speed ratio in said mechanism comprising a supplemental gear train, a supplemental sun gear in said gear train, a one way clutch connecting said supplemental sun gear with one of said first named sun gears, planet gears meshing with said supplemental sun gear, planet shafts for said planet gears and centrifugal weights fixed on said planet shafts.

12. In a transmission, driving and driven shafts, speed changing mechanism for connecting said shafts in different speed ratios, comprising a primary planetary gear train, a sun gear in said train, a sleeved mounting for said sun gear journaled on the driven shaft and connected in driving relation with the driving shaft, planet gears in said train meshing with said sun gear, a ring gear in mesh with said planet gears, means for connecting said ring gear with the driven shaft, planet shafts for said planet gears, a combined ring gear and planet carrier in which said planet shafts are mounted, secondary planet gears meshing with said combined ring gear and planet carrier, a secondary sun gear meshing with said secondary planet gears, a sleeved mounting for said secondary sun gear journaled on said sleeved mounting for the sun gear in the primary gear train, means for connecting said sleeved mounting for the secondary sun gear with the driving shaft, and means for reversing the mechanism comprising a manually operable clutch for disconnecting the secondary sun gear from the driving shaft and arresting means for arresting the rotation of the combined ring gear and planet carrier.

13. In a transmission, driving and driven shafts, speed changing mechanism for connecting said shafts in different speed ratios, comprising a primary planetary gear train, a sun gear in said train, a sleeved mounting for said sun gear journaled on the driven shaft and connected in driving relation with the driving shaft, planet gears in said train meshing with said sun gear, a ring gear in mesh with said planet gears, means for connecting said ring gear with the driven shaft, planet shafts for said planet gears, a combined ring gear and planet carrier in which said planet shafts are mounted, secondary planet gears meshing with said combined ring gear and planet carrier, a secondary sun gear meshing with said secondary planet gears, a sleeved mounting for said secondary sun gear journaled on said sleeved mounting for the sun gear in the primary gear train, means for connecting said sleeved mounting for the secondary sun gear with the driving shaft, means for automatically changing the speed ratio in said mechanism, comprising a centrifugal weight controlled supplemental gear train and a one way clutch connecting said supplemental gear train with said secondary sun gear.

14. The combination as set forth in claim 13 and in which means are provided for manually reversing the mechanism comprising a clutch for disconnecting the secondary sun gear from the driving shaft, means for arresting the rotation of the combined ring gear and planet carrier and a unit control for the clutch and arresting means.

15. In a transmission, driving and driven shafts, planetary speed changing mechanism for connecting said shafts in different speed ratios, means for changing the ratio, said mechanism embodying in its assembly primary and secondary gear trains, a combined ring gear and planet carrier connecting said trains, a sun gear in the primary train, means for connecting said sun gear with the driving shaft, a secondary sun gear in the secondary train, means for connecting said secondary sun gear with the driving shaft and means for reversing the drive, comprising a manually operable clutch for, disconnecting the secondary sun gear from the driving shaft and means operable as a unit with said clutch operating means for arresting the rotation of said combined ring gear and planet carrier.

In testimony whereof I have hereunto subscribed my name.

KENNETH E. LYMAN.